Jan. 26, 1960

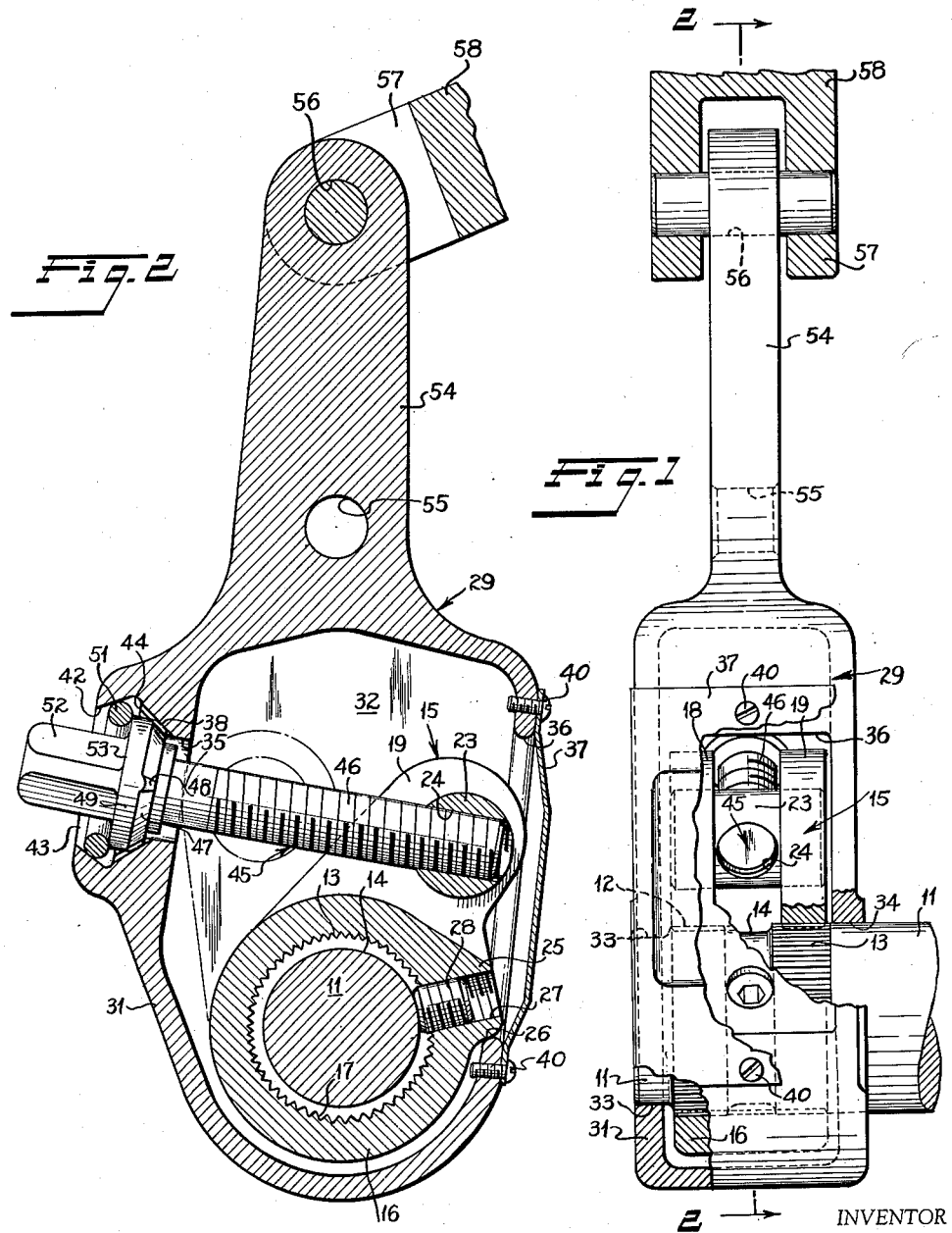

B. E. HOUSE 2,922,317

SLACK ADJUSTER

Filed June 12, 1953

INVENTOR
BRYAN E. HOUSE

BY *Strauch, Nolan & Diggins*
ATTORNEYS

United States Patent Office 2,922,317
Patented Jan. 26, 1960

2,922,317

SLACK ADJUSTER

Bryan E. House, Ashtabula, Ohio, assignor, by mesne assignments, to Rockwell-Standard Corporation, a corporation of Pennsylvania Application June 12, 1953, Serial No. 361,211

9 Claims. (Cl. 74—522)

This invention relates to slack adjusters for brake cams and the like and particularly to an enclosed type that protects the mechanism against corrosion and dirt.

The invention relates generally to mechanisms wherein two parts are relatively adjustable for the purpose of taking up play or compensating for wear in associated devices, and constitutes an improvement over earlier types of such mechanisms disclosed for example in United States Letters Patent No. 2,001,239, issued May 14, 1935, to L. R. Buckendale and United States Letters Patent No. 2,015,881, issued October 1, 1935, to H. W. Alden et al. The mechanisms disclosed in these patents operate satisfactorily generally but the adjusting members are exposed to water, dirt and like corrosive and abrasive elements, and the present invention eliminates most of the troubles from these sources as well as providing efficient lubrication.

It is the major object of this invention to provide a novel enclosed slack adjuster mechanism.

A further object of the invention is to provide a novel enclosed slack adjuster capable of retaining lubricant.

Another object of the invention is to provide a novel slack adjuster having an adjustment screw head formed with locking formations to coact with a special seat structure.

A further object of the invention is to provide a novel enclosed slack adjuster having special stop arrangements for limiting the adjustment within the enclosure.

It is a further object of the invention to provide a novel resilient locking ring and mounting structure in an enclosed type slack adjuster.

Further objects of the invention will appear as the description proceeds in connection with the appended claims and the annexed drawings wherein:

Figure 1 is an elevation partly broken away and in section illustrating an enclosed slack adjuster according to a preferred embodiment of the invention;

Figure 2 is a section on line 2—2 of Figure 1 showing the relatively adjustable parts;

In Figures 1 and 2 one end of a cam shaft 11 is illustrated. In the preferred form of the invention this is a suitably journaled brake cam shaft mounted on a suitable support on the axle with its other end carrying a cam disposed between the adjacent ends of two pivoted brake shoes, so that when the cam and cam shaft rotate about the cam shaft axis the brake shoes are oppositely rocked toward engagement with the brake drum.

Figure 5:
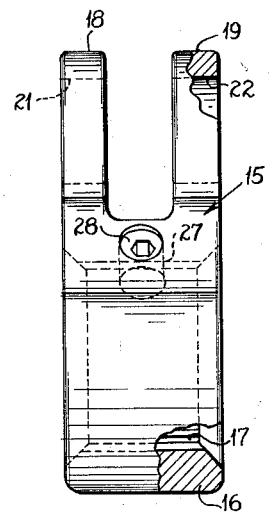
Figure 5 is an end elevation of the enclosed actuation lever.
Figure 6:
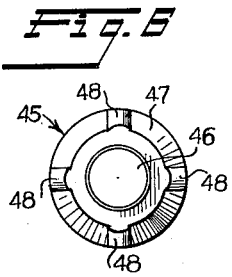
Figure 6 is an end view of the adjustment screw.

Shaft 11 is formed with annular serrated sections 12 and 13 spaced by a smooth-bottomed groove 14. A lever 15 is non-rotatably mounted on shaft 11. Lever 15 comprises a hub 16 whose bore is internally serrated at 17 so as to be removably but tightly and non-rotatably mounted on the end of shaft 11. Spaced integral ears 18 and 19 project from hub 16 and are formed with axially aligned smooth cylindrical bores 21 and 22 respectively (Figure 5).

In the assembly a cylindrical pin 23 bridges the ears 18 and 19 with its opposite ends journaled for free rocking in bores 21 and 22. Intermediate the ears 18 and 19, pin 23 is formed with a transverse threaded bore 24 whose axis is perpendicular to the axis of pin 23, for a purpose to appear.

Referring to Figure 2 particularly, hub 16 intermediate the ears 18 and 19 is formed with an integral projection 25 providing a generally radial face 26 that functions in the assembly as a limit stop to control the amplitude of adjustment of lever 15 in one direction as will be described. A threaded opening 27 through the hub at projection 25 contains a set screw 28 which, see Figure 2, may be tightened to enter shaft groove 14 in any position of assembly of the lever 15 on shaft 11 to lock the lever against axial displacement on the shaft.

In the assembly, lever 15 and the end of shaft 11 on which it is secured are enclosed within a combination lever and housing member 29. One end of member 29 is a hollow housing 31 enclosing a chamber 32 which is accessible only through aligned side wall openings 33 and 34 and end wall openings 35 and 36. Side wall openings 33 and 34 are smooth cylindrical openings of a diameter to closely surround shaft 11 on opposite sides of the serrated region, so that member 29 is freely rockably mounted on shaft 11 with which it fits with a running clearance at openings 33 and 34. Opening 35 in one end wall passes the shank of an adjustment device to be described, and opening 36 in the opposite end wall is rather large to permit introduction of lever 15 during assembly and is closed after assembly by a cover plate 37 held by screws 40.

Figure 3:
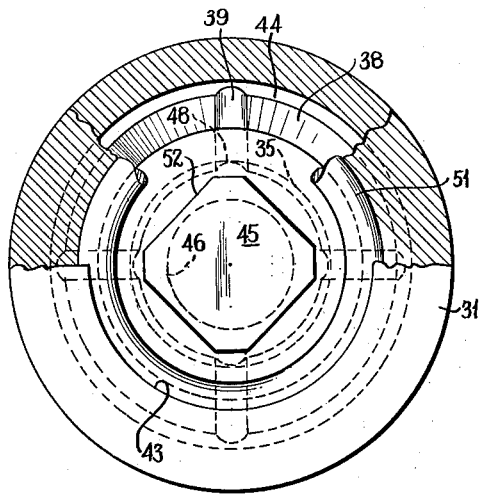
Figure 3 is a fragmentary end view partly sectioned to show the adjustment screw lock and seat.
Figure 4:
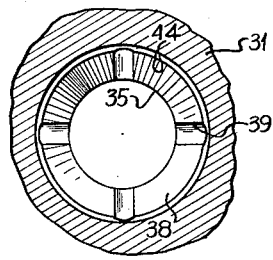
Figure 4 is a front view of the adjustment screw seat.

Outwardly of chamber 32, opening 35 leads to a generally spherical annular seat 38 which as shown in Figure 4 is formed with a series of, preferably four, radial round-bottomed grooves 39. Beyond seat 38 an annular recess formed by an undercut reverse cone surface 42 extends from outer aperture 43 to an outwardly facing radial shoulder 44 adjacent seat 38.

An adjustment screw member 45 having a long threaded end section 46 engaged with bore 24 of pin 23 is formed with a spherical seat section 47 adapted to fit universally on housing seat 38. Seat 47 is formed with a series of rounded radial ribs 48 that are of a size to fit snugly within grooves 39 when the screw 45 is in any one of four positions of rotation with the spherical seat faces in snug contact. As screw 45 is rotated about its axis, ribs 48 cam up out of grooves 39 and ride along the face of seat 38 for 90° until they line up and drop into grooves 39 again. This is continued until the desired adjustment is attained. Preferably ribs 48 are contoured to slide in line contact over seat 38.

Resilient means is provided within the recess surrounded by surface 42 for always urging screw member 45 against housing seat 38 but permitting the slight axial displacement of the screw as the ribs cam out of the housing seat grooves during rotation. In this embodiment of the invention, this resilient means is a preformed split ring 51 of tempered round steel wire which when relaxed outside the housing 31 has an external diameter greater than any diameter of surface 42. In order to introduce spring 51 into the recess its ends are resiliently displaced to opposite sides of the ring so that the ring may be radially compressed enough to pass through aperture 43, after which it is released to expand into the position of Figure 2.

When ring 51 is thus located within the recess surrounded by surface 42, it surrounds the non-circular head 52 of screw 45 and is radially compressed between inclined surface 42 and an outwardly facing radial shoulder 53 on screw 45. In the partially compressed spring in Figure 2, the ends of the ring are slightly separated as shown in dotted lines in Figure 7, and this will be true when it is in the position of Figure 2 in the assembly.

Figure 7:
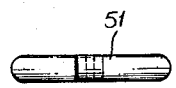
Figure 7 is an elevation of the relaxed spring ring for the adjustment screw.

In the assembly, radially compressed spring ring 51 tends to regain its expanded full line position of Figure 7, and in doing so it reacts between shoulder 53 and inclined surface 42 to exert an axial resilient force on the member 45 to the right in Figure 2, and it will be confined peripherally by surface 42.

During rotation of screw 45, as by a tool applied to head 52, when the screw is cammed to the left in Figure 2 by ribs 48 lifting out of grooves 39, the circular spring ring 51 retains its resilient axial force on screw member 45 while the entire ring 51 as a whole shifts axially along surface 42 toward aperture 43, ring 51 further compressing to permit this shift. However, the outer diameter of ring 51 when its ends abut is greater than aperture 43 so that it is not possible to displace ring 51 out of the housing 31 by mere rotation of the screw 45, and the parts are so dimensioned that the ring ends cannot abut at least until after ribs 48 are clear of grooves 39, and after the ribs are on seat 38 all of the parts may relatively rotate. When the screw 45 has been rotated until grooves 39 and ribs 48 are aligned in the adjustment position, the spring 51 urges the seats together and the parts regain the position of Figure 2.

Member 29 is integrally formed above housing 31 with a lever section 54 having spaced holes 55 and 56 to either of which may be pivotally attached a clevis 57 on the end of an actuating member 58 operably connected to a fluid pressure motor or the like.

In assembly, the lever 15 is introduced through end wall opening 36, and shaft 11 is thrust through openings 33 and 34 and the serrated bore of the lever until these parts are in the position of Figure 1, and set screw 28 is tightened. Then the adjusting screw 45 is introduced through aperture 35 and threaded in pin 23 and the spring ring is installed in the recess defined by surface 42. A suitable amount of lubricant may be applied within chamber 32. For example, chamber 32 if desired may be packed with grease. Then cover 37 is installed to enclose the housing. If desired, suitable grease seals may be used at openings 33 and 34, but the seating surfaces 38 and 47 are adequate to prevent loss of lubricant through opening 35. When lubrication is desired, cover plate 37 may be removed for that purpose.

Preferably the cam shaft is so arranged and the lever 15 is so placed on the cam shaft that the lever 15 is initially in substantially the full line position of Figure 2, this representing the position where there is just enough operative slack in the mechanism. There is provided within the chamber 32 enough space to permit the full angular adjustment of lever 15 until stopped by contact with the flat end wall surrounding opening 35 simply upon rotation of screw member 45 by turning head 52. As screw 45 rotates clockwise within pin 23, it pulls the pin and lever 15 to the left in Figure 2 and the center of pin 23 moves along the arc of a circle whose center is at the axis of shaft 11, the free rotation of the pin and the universal joint seat of the screw member 45 permitting compensative movement of the parts to prevent binding as the lever angle changes.

When the screw member 45 is turned in the other direction, rocking of lever 15 clockwise in Figure 2 is limited by engagement of face 26 with the edge of end wall opening 36 whereby adjustment of screw member 45 will not cause lever 15 to engage and burst cover plate 37. The limit of movement of lever 15 in the other direction is reached when the ears 18 and 19 engage the inner end wall of housing 31 as previously described.

During this rotation of screw member 45, the operator can feel and hear the ratcheting action at the valve seat and through experience may soon know how many turns will give a desired turning of the cam to compensate for a certain wear of the brake shoes. Moreover, the operator looking through aperture 43 may view ring 51 and tell from its position whether or not screw 45 is in one of its 90° lock positions. If the ring 51 can be seen to be near the aperture 43, this means that the ribs 48 are riding on surface 38 and it is necessary to turn the screw further to obtain a locked position wherein the ribs are in the corresponding housing seat grooves.

During operation of the vehicle brakes, the actuator rocks member 29 counterclockwise about the axis of shaft 11 on which it is journaled and the screw 45 serves as a motion transmitting connection between member 29 and lever 15 so that cam shaft 11 is correspondingly rocked. Should the brake linings become worn, rotation of screw member 45 will angularly rotate shaft 11 counterclockwise with respect to member 29 and the cam will therefore start rotation in a new position. This minimizes lost mechanical motion between the actuator and the brake shoes.

After the parts have reached the limit of adjustment shown in phantom lines in Figure 2, it is possible to obtain a further adjustment in the same direction by rotating screw member 45 to put the parts back in the full line position of Figure 2, loosening screw 28, and removing and reinserting the cam shaft with the cam turned to an advanced position, and again locking set screw 28.

The slack adjuster of the invention with its enclosed mechanism retains lubricant and housing 31 excludes dirt and water, so that it is capable of a long useful life during which the vulnerable parts are protected against injury and corrosion.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a rotatable shaft, a first lever fixed to said shaft for rotation therewith, a second lever mounted for free rotation about the axis of said shaft and comprising a housing portion enclosing said first lever and the associated part of said shaft, and means interconnecting said levers within said housing portion adjustable for varying the relative angular relation of said levers with respect to said shaft comprising a pin on said first lever journaled for rotation about an axis parallel to the axis of said shaft and having a threaded transverse bore, an opening in the side of said housing portion surrounded by an outwardly facing annular seating surface, an adjustment member rotatably and angularly adjustably mounted in said housing extending through said opening and having a threaded section engaged in said pin bore and an operating head projecting externally of said housing portion, said adjustment member having an annular seating surface coacting with the seating surface on said housing portion, at least one projection on one of said surfaces and at least one corresponding recess in the other of said surfaces into which said projection fits to permit engagement of said surfaces in predetermined positions of rotation of said adjustment member, and resilient means disposed within said opening and compressed between the housing and said adjustment member for urging said seating surfaces together but permitting axial displacement of said adjustment member when said projection cams out of said recess during rotation of said adjustment member.

2. In combination with a rotatable shaft, a first lever fixed to said shaft for rotation therewith, a second lever mounted for free rotation about the axis of said shaft and comprising a housing portion enclosing said first lever and the associated part of said shaft, said housing portion having an aperture in a wall thereof, means interconnecting said levers within said housing portion adjustable for varying the relative angular relation of said levers with respect to said shaft comprising a member extending through said aperture threadedly engaged with said first lever and rotatably and angularly adjustably mounted on a seat on said second lever surrounding said aperture, coacting means on said seat and member for locking said member against rotation, and means disposed within said aperture resiliently urging said member against said seat but permitting periodic small axial displacements of said member away from said seat to release said locking means during rotation of said member.

3. In combination with a rotatable shaft, a first lever fixed to said shaft for rotation therewith, a second lever mounted for free rotation about the axis of said shaft and comprising a housing portion enclosing said first lever and the associated part of said shaft, and means interconnecting said levers within said housing portion adjustable for varying the relative angular relation of said levers with respect to said shaft comprising a member operatively connected to said first lever rotatably and angularly adjustably mounted on a seat surrounding an opening in a wall of said housing portion and having an operating head projecting externally of said housing portion through an aperture at the outer end of said opening, said opening having an inclined surface recess of outwardly of said seat and of increasing diameter inwardly of said aperture, and a spring in said recess reacting between said inclined surface and said member for constantly urging said member inwardly of said housing and toward said seat.

4. In the combination defined in claim 3, said member having a shoulder facing said aperture and said spring comprising a radially compressed split spring ring surrounded by said inclined surface and disposed between said inclined surface and said shoulder.

5. In the combination defined in claim 4, said spring ring when relaxed apart from said assembly having its opposite ends materially spaced from each other, and being of such dimensions that when it is radially compressed until said ends abut, the outer ring diameter is less than the diameter of said aperture.

6. In combination with a rotatable shaft, a first lever fixed to said shaft for rotation therewith, a second lever mounted for free rotation about the axis of said shaft and comprising a portion journaled on the associated part of said shaft, and means interconnecting said levers adjustable for varying the relative angular relation of said levers with respect to said shaft comprising a member threadedly connected to said first lever and rotatably and angularly adjustably mounted on said second lever, said member and said second lever having coacting substantially spherical seating surfaces formed with locking ribs and grooves that interfit in predetermined positions of rotation of said member, and resilient means between the member and second lever biasing said seating surfaces together but permitting periodic small relative axial displacement of seating surfaces when said member is rotated and the ribs cam out of the associated grooves.

7. In combination, a rotatably mounted brake cam shaft or the like, annular serrated portions at one end of said shaft spaced by an annular groove, a first lever having an internally serrated hub mounted on said shaft end bridging said groove, a removable fastening element on said hub projecting into said groove to prevent axial displacement of said first lever on said shaft, spaced ears on said first lever rotatably mounting a pin having a transverse threaded bore between said ears, a second lever having a housing portion enclosing said first lever and the serrated portions of said shaft, said housing portion having side wall openings surrounding said shaft on opposite sides of the serrated portions and by which said second lever is journaled for free rotation on said shaft, means for rocking said second lever about said shaft, an adjustment member interconnecting said levers mounted for rotation and angular adjustment in a wall opening of said housing portion and having a threaded end section engaged with said pin bore and a head projecting externally of said housing portion for actuation by a tool, and a compression spring within said wall opening reacting between said second lever and the adjustment member.

8. In combination with a rotatable cam shaft, mechanism for rocking said shaft to operate an associated brake assembly comprising a first lever fixed to said shaft for rotation therewith, a second lever mounted for free rotation about the axis of said shaft and comprising a housing portion enclosing said first lever and the associated part of said shaft, said housing portion having integral opposite side walls and end walls, said side walls being provided with coaxially aligned openings closely surrounding said shaft so that said second lever is freely rockably mounted on said shaft and one end wall having an opening of sufficient size for introduction of said first lever into said housing portion during assembly, a removable cover over said end wall opening, means interconnecting said levers within said housing portion adjustable for varying the relative angular relation of said levers with respect to said shaft to vary the initial angular position of said camshaft about its axis with respect to said associated brake assembly, and means journalled in the end wall of said housing portion opposite said one end wall with said opening and accessible externally of said housing portion for actuating said adjustable means.

9. In combination with a rotatable shaft: a first lever fixed to said shaft for rotation therewith; a second lever mounted for free rotation about the axis of said shaft and comprising a portion journalled on the associated part of said shaft over said first lever, said portion including an end wall having an aperture including a seat therein; means interconnecting said levers adjustable for varying the relative angular relation of said levers with respect to said shaft comprising a member extending through said aperture, threadedly engaged with said first lever and rotatably and angularly adjustably mounted on said seat on said second lever; coacting means on said seat and member comprising ribs and grooves that interfit in predetermined positions of rotation of said member and provide detents that restrain said member against rotation; and resilient means disposed in said aperture biasing said seating surfaces together but permitting periodic small relative axial displacement of seating surfaces when said member is rotated and the ribs cam out of the associated grooves.

References Cited in the file of this patent
UNITED STATES PATENTS

| | | |
|---|---|---|
| 739,331 | Melcher | Sept. 22, 1903 |
| 971,103 | Bachman | Sept. 27, 1910 |
| 1,351,937 | Alldredge | Sept. 7, 1920 |
| 1,734,935 | Zaccone | Nov. 5, 1929 |
| 1,908,462 | Taylor | May 9, 1933 |
| 2,001,239 | Buckendale | May 14, 1935 |
| 2,012,011 | Keller | Aug. 20, 1935 |
| 2,015,881 | Alden et al. | Oct. 1, 1935 |
| 2,037,586 | Olson | Apr. 14, 1936 |
| 2,156,154 | Hooker | Apr. 25, 1939 |
| 2,226,662 | Humphrey | Dec. 31, 1940 |
| 2,402,828 | Michael | June 25, 1946 |